LEVI MOORE.
Improvement in Fences.
No. 114,178.  Patented April 25, 1871.
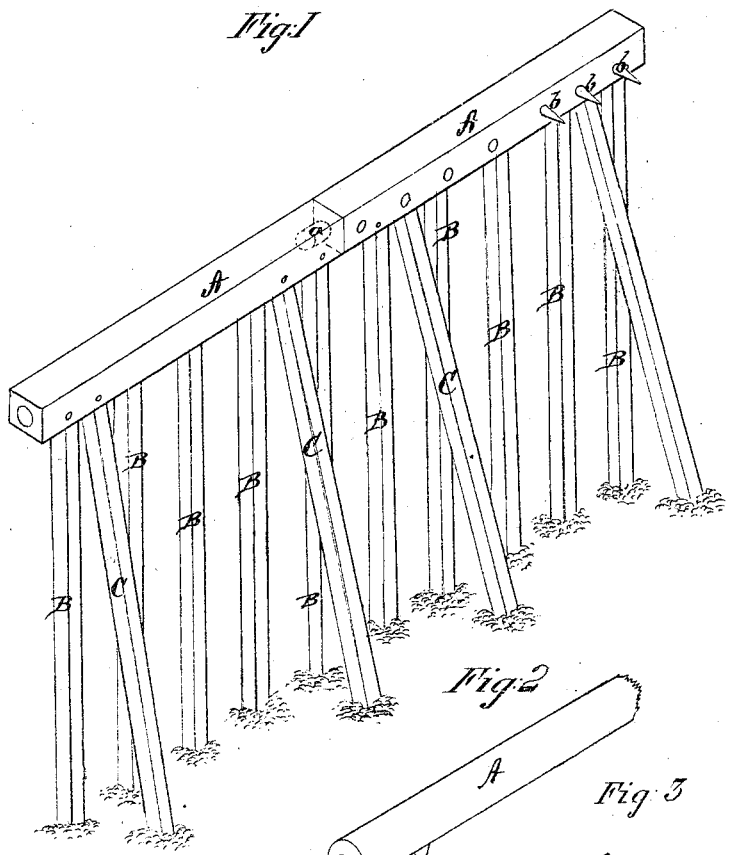
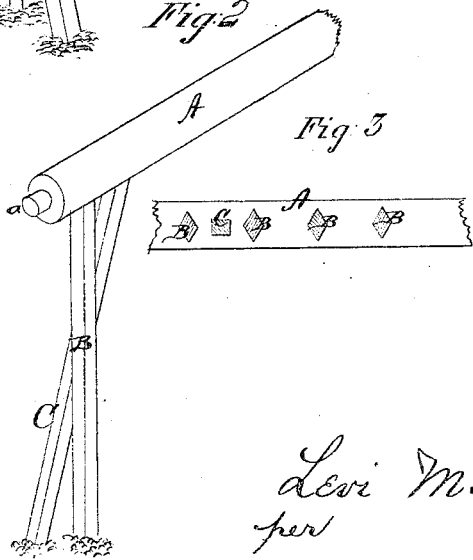
Witnesses.  Inventor.
C. L. Evert  Levi Moore
A. A. Yeatman  per
  Alexander Mason
  Atty.

UNITED STATES PATENT OFFICE.

LEVI MOORE, OF BARABOO, WISCONSIN.

IMPROVEMENT IN FENCES.

Specification forming part of Letters Patent No. 114,178, dated April 25, 1871.

*To all whom it may concern:*

Be it known that I, LEVI MOORE, of Baraboo, in the county of Sauk, and in the State of Wisconsin, have invented certain new and useful Improvements in Fence; and do hereby declare that the following is a full, clear, and exact description thereof, reference being had to the accompanying drawing, and to the letters of reference marked thereon, making a part of this specification.

The nature of my invention consists in the construction and arrangement of a fence, as will be hereinafter more fully set forth.

In order to enable others skilled in the art to which my invention appertains to make and use the same, I will now proceed to describe its construction and operation, referring to the annexed drawing, in which—

Figure 1 is a perspective view of my fence. Fig. 2 shows a modification of the same, and Fig. 3 is a bottom view of the top rail.

A represents the top rail, which may be either square, as shown in Fig. 1, or round, as shown in Fig. 2, according to the kind of lumber most convenient from which to make the same. These top rails are joined together by means of a tenon, *a*, formed upon one end, to be inserted in a hole made for that purpose in the end of the adjoining rail. A strip of tarred canvas may then be placed over this joint, in order to prevent water from entering into the same. On the under side of the top rails, A, are made holes for the insertion of the stakes B B, which are made square, as shown, but inserted so as to present the corner or angle on both sides of the fence; in other words, they are placed diamond-shaped, as shown in Fig. 3. Placed in this manner they will present a sharp edge to the animals approaching, which will deter them from attempting to tear or pull the fence down. These stakes are inserted perpendicularly for a suitable depth into the ground, and the fence is braced by means of posts C C, set at any angle desired into the ground, their upper ends being inserted in holes made for that purpose in the under sides of the top rails, A.

It will be noticed that the stakes B B and braces C C are joined to the top rails on the under sides of said top rails, which effectually prevents any water from coming into said joints and rotting the wood.

For further security from animals, the top rails may be provided with barbs *b b*, as shown in Fig. 1.

Having thus fully described my invention, what I claim as new, and desire to secure by Letters Patent, is—

A fence composed of the top rails, A A, stakes B B, and braces C C, with or without the barbs *b b*, all constructed and arranged substantially as herein set forth.

In testimony that I claim the foregoing I have hereunto set my hand and seal this 22d day of November, 1870.

LEVI MOORE. [L. S.]

Witnesses:
C. L. EVERT,
JOHN BALEY.